(12) United States Patent
Götzelmann et al.

(10) Patent No.: US 9,821,539 B2
(45) Date of Patent: Nov. 21, 2017

(54) METHOD FOR CONNECTING THERMOPLASTIC, COATED COMPONENTS AND PLASTIC COMPONENT

(71) Applicant: Magna Exteriors GmbH, Sailauf (DE)

(72) Inventors: Johannes Götzelmann, Altertheim (DE); Heiner Salzmann, Uhingen (DE)

(73) Assignee: MAGNA Exteriors GmbH, Sailauf (DE)

( * ) Notice: Subject to any disclaimer, the term of this patent is extended or adjusted under 35 U.S.C. 154(b) by 467 days.

(21) Appl. No.: 14/522,797

(22) Filed: Oct. 24, 2014

(65) Prior Publication Data
US 2015/0118453 A1 Apr. 30, 2015

(30) Foreign Application Priority Data

Oct. 25, 2013 (DE) .......................... 10 2013 221 724

(51) Int. Cl.
*B29C 65/00* (2006.01)
*B32B 37/00* (2006.01)
(Continued)

(52) U.S. Cl.
CPC .......... *B32B 37/06* (2013.01); *B29C 65/1432* (2013.01); *B29C 66/1122* (2013.01);
(Continued)

(58) Field of Classification Search
CPC ......... B29C 65/00; B29C 65/02; B29C 65/14; B29C 65/1412; B29C 65/1429; B29C 65/1432; B29C 65/1445; B29C 65/1448; B29C 65/1451; B29C 65/1464; B29C 65/1467; B29C 65/18; B29C 66/00; B29C 66/003; B29C 66/006; B29C 66/01; B29C 66/02; B29C 66/242; B29C 66/2424; B29C 66/24243; B29C 66/24244; B29C 66/347; B29C 66/3472; B29C 66/3474; B29C 66/348; B29C 66/43; B29C 66/71; B29C 66/73921; B29C 66/8322; B29K 2023/12; B32B 27/00; B32B 27/32; B32B 37/00;
(Continued)

(56) References Cited

U.S. PATENT DOCUMENTS 3,053,726 A * 9/1962 Larson .................... B29C 37/04
156/304.2
5,035,045 A * 7/1991 Bowen ................ B29C 65/1412
156/273.3
(Continued)

FOREIGN PATENT DOCUMENTS

DE 202006003323 U1 * 8/2006 ............. B29C 65/14
GB 1488999 A * 10/1977 ......... B29C 49/0047
(Continued)

OTHER PUBLICATIONS

Office Action for Korean Patent Application No. 10-2014-0143154, dated Aug. 23, 2016, 10 pages including 5 pages of English translation.

*Primary Examiner* — Philip Tucker
*Assistant Examiner* — Brian R Slawski
(74) *Attorney, Agent, or Firm* — Jordan IP Law, LLC; Todd A. Vaughn

(57) ABSTRACT

A method for connecting thermoplastic components, in which the opposing surfaces thereof are at least partially melted by introducing energy.

15 Claims, 3 Drawing Sheets

(51) Int. Cl.
*B32B 38/04* (2006.01)
*B32B 27/00* (2006.01)
*C08J 5/00* (2006.01)
*B65C 9/25* (2006.01)
*B60R 13/04* (2006.01)
*B62D 27/02* (2006.01)
*B62D 29/04* (2006.01)
*B32B 37/06* (2006.01)
*B32B 7/04* (2006.01)
*B32B 27/08* (2006.01)
*B32B 37/04* (2006.01)
*B32B 37/30* (2006.01)
*B32B 38/00* (2006.01)
*B32B 27/32* (2006.01)
*B29C 65/14* (2006.01)
*B29C 65/78* (2006.01)
*B29L 31/30* (2006.01)

(52) U.S. Cl.
CPC .... *B29C 66/1142* (2013.01); *B29C 66/24244* (2013.01); *B29C 66/3472* (2013.01); *B29C 66/3474* (2013.01); *B29C 66/54* (2013.01); *B29C 66/91423* (2013.01); *B32B 7/045* (2013.01); *B32B 27/08* (2013.01); *B32B 27/32* (2013.01); *B32B 37/04* (2013.01); *B32B 37/30* (2013.01); *B32B 38/0036* (2013.01); *B29C 65/7847* (2013.01); *B29C 66/41* (2013.01); *B29C 66/545* (2013.01); *B29C 66/71* (2013.01); *B29C 66/8322* (2013.01); *B29L 2031/3055* (2013.01); *B32B 37/0076* (2013.01); *B32B 2250/02* (2013.01); *B32B 2250/24* (2013.01); *B32B 2605/08* (2013.01); *Y10T 428/24802* (2015.01); *Y10T 428/24826* (2015.01)

(58) Field of Classification Search
CPC . B32B 37/0046; B32B 37/0076; B32B 37/04; B32B 37/06; B32B 37/065; B32B 37/182; B32B 37/187; B32B 2605/08; B29L 2031/3055
USPC ..... 156/60, 64, 228, 242, 245, 272.2, 275.1, 156/278, 290, 292, 306.6, 308.2, 308.4, 156/309.6, 309.9, 322; 296/191, 146.1, 296/146.2, 146.3, 146.5, 146.6, 146.9
See application file for complete search history.

(56) References Cited

U.S. PATENT DOCUMENTS 6,203,092 B1* 3/2001 Yoshinaka ........... B62D 25/142
180/90
8,302,649 B2* 11/2012 Bol ..................... B29C 65/1412
156/379.8
2003/0221783 A1* 12/2003 Evans ................. B29C 65/1432
156/359

FOREIGN PATENT DOCUMENTS

| JP | 61219629 A | * | 9/1986 | ............ B29C 65/20 |
| JP | 2002-127327 A | | 5/2002 | |
| JP | 2012-116062 A | | 6/2012 | |
| KR | 10-0351539 B1 | | 9/2002 | |

* cited by examiner

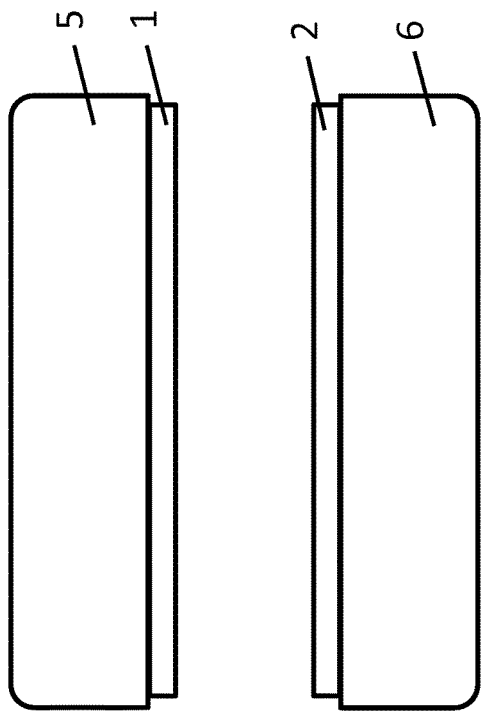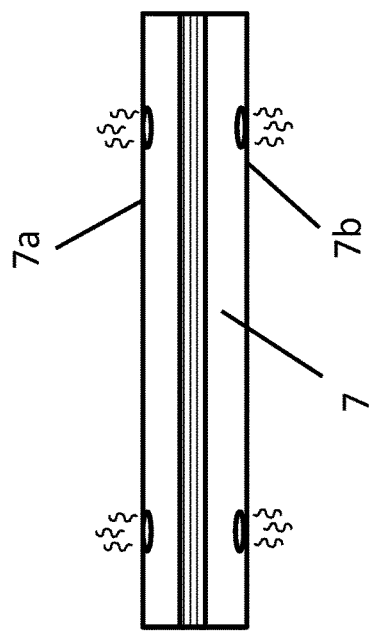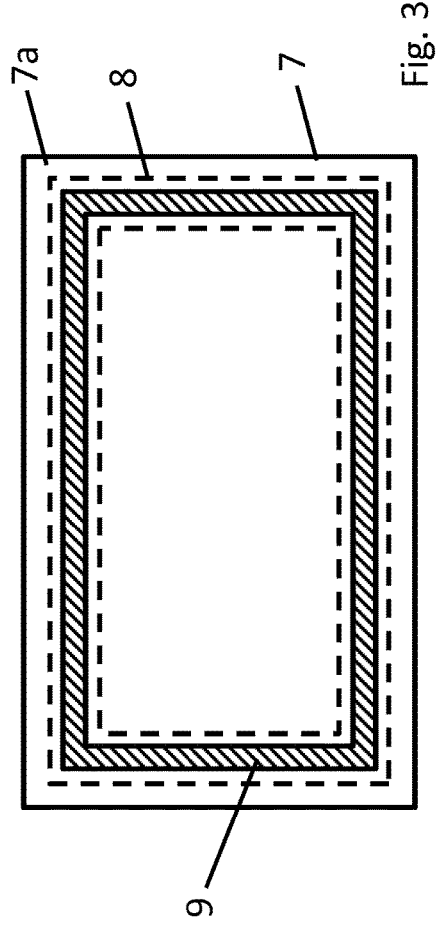
Fig. 2
Fig. 3

METHOD FOR CONNECTING THERMOPLASTIC, COATED COMPONENTS AND PLASTIC COMPONENT

CROSS-REFERENCE TO RELATED APPLICATIONS

The present application claims priority 35 U.S.C. §119 to German Patent Publication No. DE 10 2013 221 724.2 (filed on Oct. 25, 2013), which is hereby incorporated by reference in its entirety.

TECHNICAL FIELD

Embodiments relate to a method for connecting two thermoplastic components, wherein the opposing surfaces thereof are at least partially melted by introducing energy, and also a plastic component connected by way of the method.

BACKGROUND

The welding of components from polymer material has been known for a long time. It enables complex assembled structures to be built up from individual components. Welding is used in the manufacture of components for motor vehicles, for example.

In that case, components with large dimensions, e.g., bumper claddings made of polymer material or wings made of the respective sheet-like parts forming the external skin and of structural elements that serve for reinforcement, for example, are joined together by welding. The structural elements are also used for shaping, reinforcing and fastening the components forming the external skin. Here, very high requirements are set in respect of dimensional accuracy and the appearance of said components.

Welding is generally accomplished by way of "welding domes," i.e., lugs which are arranged on one part and pass through the corresponding apertures in the second component and, in this state, connect it by a riveting action by way of ultrasonic welding or ultrasonic riveting, for example, through a change in shape in the softened state. However, there are also welding techniques such as vibration welding, rotary welding or welding by way of the action of heat or radiation which are likewise used in this case.

In this context, German Patent Publication No. DE 20 2005 013 901 discloses a method which welds individual ridges.

Problems have always occurred, however, with the known welding method when coated components are to be connected.

As a solution for connecting at least partially coated outer shells to inner shells, adhesive bonding is chosen in the prior art, but a pre-treatment of the component surface is generally necessary as well.

In addition, adhesive joints represent a weakening of the stiffness of the component since the adhesives can only have a low strength and rigidity and, as a result, the joint is compromised mechanically at the adhesive bonding point. PP, that is to say polypropylene or polypropene, is widely used in vehicle construction. Large-area structures in particular, such as the internal trim of vehicles but also tailgates and doors, are produced from this plastic.

There are several welding methods available for welding PP, e.g., hot element welding, ultrasonic welding or laser welding. The principle behind these welding methods is that the welding zone is softened, i.e., converted to a state in which it can be shaped, by supplying energy from the outside, this being a method in several stages since heating and joining do not take place simultaneously. The method envisages that heating elements heat the connection points of the plastic parts until they reach the melting temperature. The connection points are then pushed on to one another and pressed together until they cool fully.

SUMMARY

Embodiments relate to a method for connecting components, in which the components are coated at least partially and also in the area of connection on the rear side.

In accordance with embodiments, a method for connecting two thermoplastic components includes at least partially melting opposing surfaces of the components by introducing energy. In this case, at least one of the two plastic components has at least in part an extended-area coating. The connection points and/or connection surfaces lie at least partially behind a coated surface and do not appear through the coating after the connection process.

In accordance with embodiments, a method for connecting thermoplastic components includes at least one of: introducing energy to at least partially melt opposing surfaces of a first thermoplastic component having at least in part an extended-area coating and a second thermoplastic component, wherein connection points and/or connection surfaces of the first thermoplastic component lie at least partially behind a coated surface and do not appear through the coating after introducing energy.

In accordance with embodiments, a plastic component prepared by a method that includes at least one of: introducing energy to at least partially melt opposing surfaces of a first thermoplastic component having at least in part an extended-area coating and a second thermoplastic component, wherein connection points and/or connection surfaces of the first thermoplastic component lie at least partially behind a coated surface and do not appear through the coating after introducing energy.

The method in accordance with embodiments has the advantage that thermoplastics can be used, and the appearance of coated surfaces is not prejudiced.

It is furthermore advantageous that polypropylene can be used as a material for the plastic components.

In order to produce a precise weld, initially, tool parts of the machine tool are moved together and calibrated. For this purpose, they are moved towards one another and, in this way, the inserted plastic components are aligned in an optimum manner.

For good welding of relatively large components, it is advantageous that the heating device has at least one frame-type heating zone.

It is furthermore advantageous that the heating device has heating zones in both radiation planes and that the heating zones can be controlled separately from one another.

It is also advantageous that the heating zones of each radiation plane are controlled separately in the course thereof.

It is furthermore advantageous for a minimum effect on the coating that the heating zones which heat the plastic component with a coating behind the connection point produce an energy input that is reduced relative to the uncoated area.

It is furthermore advantageous that the heating zone forms a closed frame structure.

It is advantageous if the heating zones are arranged spaced apart by an edge spacing a from the edge of the components to be connected.

The heat input in the component which has a coating takes place over an input width b. Here, it is advantageous if the input width is chosen so that heat distribution into the component takes place gently.

It is furthermore advantageous that the penetration depth of the heat input for the components with a coating is only up to half or up to two thirds of the thickness z of the component.

Plastic components which are produced by the method in accordance with embodiments advantageously preserve the rigidity of the original material, even at the connection points and/or connection surfaces.

An advantageous embodiment is a plastic component which forms a motor vehicle rear door.

It is furthermore advantageous here if reinforcing components are inserted into at least one of the components.

DRAWINGS

Embodiments will be illustrated by way of example in the drawings and explained in the description below.

FIG. 2 illustrates a machine for connecting components, in accordance with embodiments.

FIG. 3 illustrates a plan view of a heating device, in accordance with embodiments.

DESCRIPTION

Figure 1:
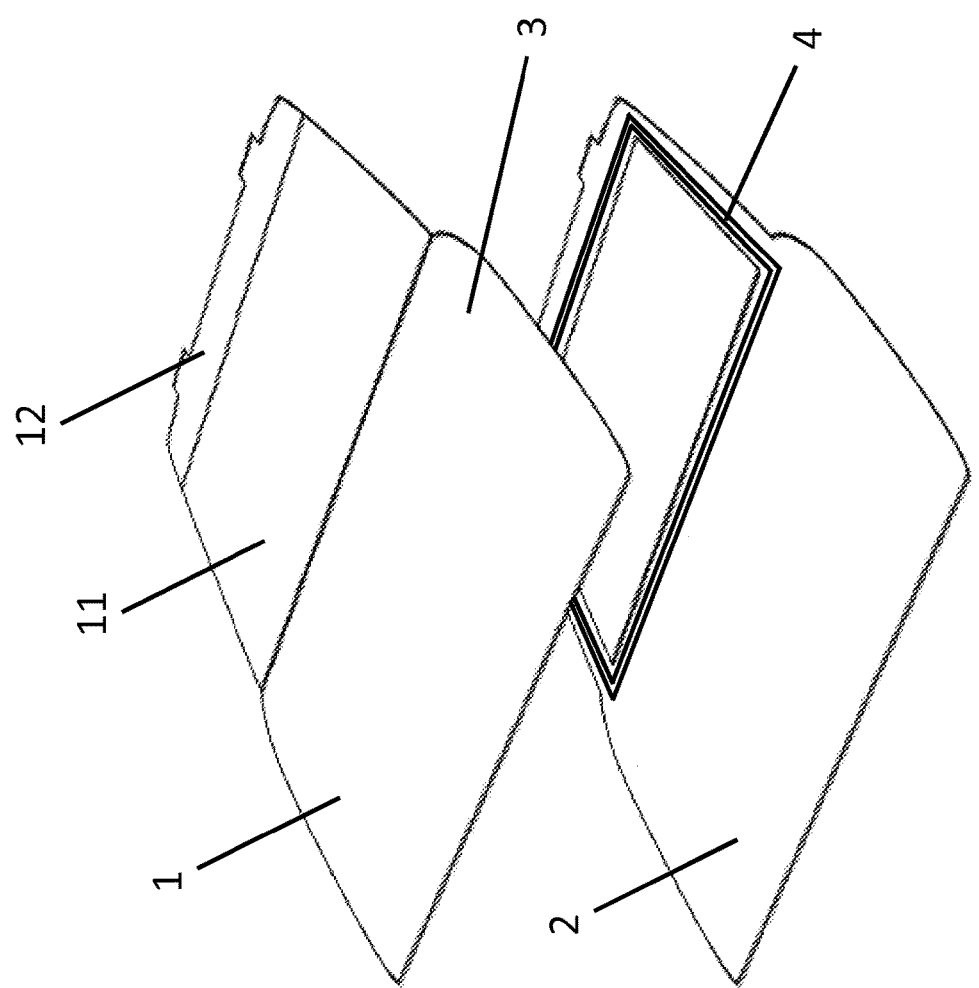
FIG. 1 illustrates a motor vehicle rear door, in accordance with embodiments.

FIG. 1 illustrates a motor vehicle rear door, which is constructed from two large-area components, namely an outer shell 1 and an inner shell 2. The two shells 1, 2 have a cutout 11, which is provided for the insertion of a rear window. Projections for a hinge 12 are provided on the upper bar of the outer shell and on the inner shell. In the illustration, the outer shell 1 can be seen in a view of its external skin or surface. The external skin/surface has a coating 3. In the example, the coating 3 is to cover the lower area of the outer shell 1, which is situated below the cutout 11. In this simplified illustration, the bars which frame the cutout 11 for the rear window are not illustrated. These sidebars and the upper bar can also be coated with the coating 3. Depending on the requirements of the motor vehicle manufacturer, the areas which are coated are arranged in different ways. In the case of the example of a motor vehicle rear door, the second plastic component, the inner shell 2, is generally not coated. The view of the inner shell 2 shows the inner surface thereof, which is no longer visible after the connection of the components.

A frame 4 is indicated in FIG. 1, surrounding the cutout 11 as a reinforcing frame, for example. A reinforcing frame of this kind can be configured as a closed or, alternatively, as an open frame in the form of a U. The reinforcing frame or, alternatively, individual reinforcing elements are inserted into prepared recesses in the inner shell 2. After the connection process, the reinforcing elements are held by the clamping action between the two components 1, 2. If plastic components are likewise used as reinforcing elements, these being inserted into the inner shell 2 as tubular structures, these plastic components can be welded simultaneously with the connection of the sheet-like components.

Construction in the reverse sequence is of course conceivable, with reinforcing elements being arranged in the outer shell before the component elements are connected.

FIG. 2 illustrates schematically a machine having an upper tool part 5 and a lower tool part 6. Arranged between them is a heating device 7, which in this illustration is arranged at a lateral distance from the tool parts. The outer shell 1 is placed in the upper tool part 5. This is accomplished by vacuum suction, in which the coating 3 makes contact in the direction of the upper tool part 5. The inner shell 2 is placed in the lower tool part 6. When both components 1, 2, have been arranged in the machine tool, the two tool parts 5, 6 move towards one another. In general, the lower tool part 6 is arranged in a static manner, and the upper tool part 5 is moveable in a vertical direction (i.e., upwardly and downwardly with respect to the lower tool part 6) towards the lower tool part 6. Initially, the tool parts 5, 6 are moved together in order to optimize the alignment of the plastic components 1, 2, relative to one another and to calibrate the alignment before the actual welding process.

Once calibration is complete, the upper tool part 5 is moved upwardly away from the lower tool part 6 again, and the heating device 7 is pushed horizontally in the space between the tool parts 5, 6. The heating device 7 has two radiation planes, an upper radiation plane 7a and a lower radiation plane 7b. In this illustrative embodiment, the two radiation planes 7a, 7b are thermally decoupled from one another and are separately or otherwise independently controllable.

The heating device 7 is surrounded by the tool parts 5, 6 in such a way that the heat sources of the heating device 7 are not in direct contact with the plastic components 1, 2, but that only an energy input into the plastic components 1, 2 occurs. Here, there will be less radiation of heat energy into the outer shell 1 than into the inner shell 2. This takes account of the problem that the welding operations must not compromise the coating 3.

After a predetermined time, the heating device 7 is laterally moveable from the space between the tool parts 5, 6 again, and the tool parts 5, 6 are then immediately closed. Since the outer shell 1 and the inner shell 2 have melted at the predetermined points due to the introduction of energy from the heating device 7, the melted connection points are connected to one another and cooled under a slight pressure. During this process, the pressure must not be too high so as to avoid the material giving way and stresses occurring at the surfaces, especially at the coated surfaces.

As illustrated in FIG. 3, a plan view of the radiation plane 7a is provided. In this example, the heating device 7 bears a heating zone 9 which is designed as a peripheral frame. The outside dimensions 8 of the component of the outer shell 1 are indicated by a dashed contour. It can be seen that the heating zones 9 are inside the edge of the component 1. In this example, the heating zone 9 is designed as a strip of uniform thickness. In alternative embodiments, it is also possible to use different, discontinuous areas, thereby simplifying separate control of the individual areas. Heat distribution is influenced by reducing the cross section of the heating zones 9.

Figure 4A:
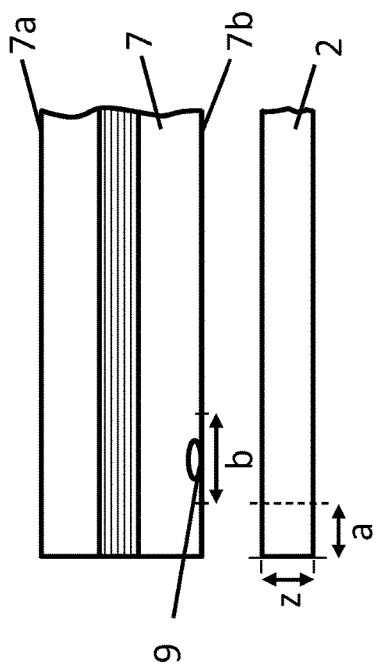
FIGS. 4a to 4c illustrates a detail of the heating device and heat distributions, in accordance with embodiments.
Figure 4B:
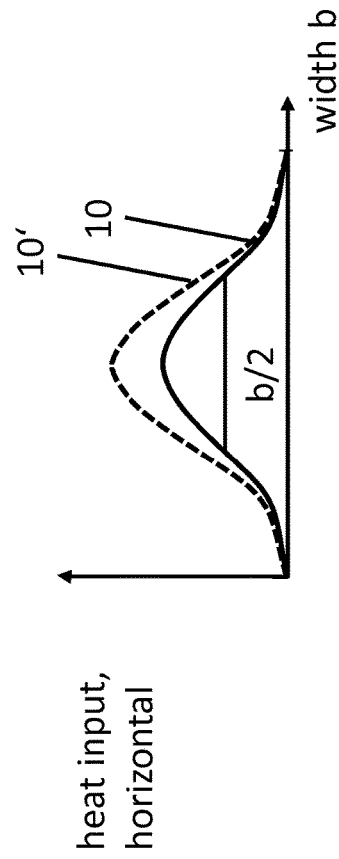

As illustrated in FIG. 4a, a portion of the heating device 7 and the inner shell 2 is provided. The heating device 7 contains the heating zones 9, the influence of which extends over an input width "b." The function of the radiation over the width b is illustrated in FIG. 4b. This is a Gaussian distribution, the extremities of which allow a gentle transition of the heat input from the maximum to the unaffected area. The solid line 10 with the lower radiation output shows the energy input into the outer shell 1, which must not be melted so strongly because of the coating 3. The dashed line 10' shows the heat input into the inner shell 2. An optimum time-to-half value here is b/2.

Figure 4C:
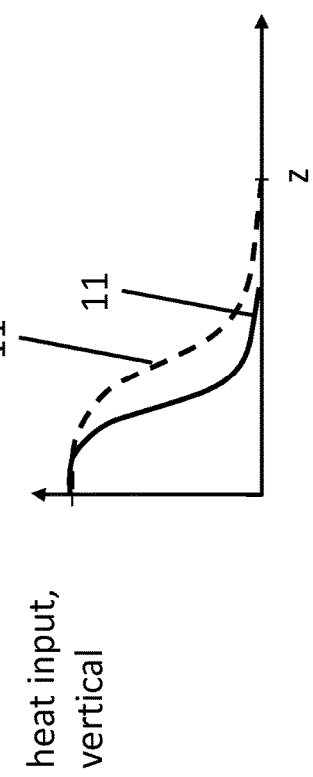

As illustrated in FIG. 4c, the energy input against the thickness of the inner and outer shells is provided. Here too, the solid line 11 shows the energy input in the coated outer shell 1, while the energy input for the inner shell 2 is shown by a dashed line, extending to a greater penetration depth. On the basis of the drawings, it is clear that welding is also performed in the areas of the inner surface of the outer shell 1 which are coated 3 on the outer side. This is also intended to be conveyed by the expression that the connection points and/or connection surfaces are at least partially behind a coated surface.

The optimum melting conditions for the two components 1, 2 are determined by setting different parameters, such as the energy output, penetration depth, input width and time. Here, the melting is asymmetrical since there are different energy inputs into the components 1, 2. In this case, the arrangement of the heating zones 9 follows the functional requirements of a welded joint. In the case of the rear door, the two shells 1, 2 are welded to one another along the periphery. In this case, a spacing "a" from the edge is chosen. The edge spacing "a" here must be a few millimeters to ensure that there is no heat input directly at the edge and that the component is not distorted.

If there are also inserts, such as reinforcing elements, composed of different materials in the shells of the components, the parameters for the introduction of heat must be modified.

A reinforcement comprising plastic elements is a special case here. If these plastic elements are likewise to be welded during the welding of the two shells, there must be spot increases in the energy outputs to the material.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS 1 outer shell
2 inner shell
3 coating
4 frame
5 upper tool part
6 lower tool part
7 heating device
7a upper radiation plane
7b lower radiation plane
8 contour component
9 heating zone
10, 10' heat distribution, horizontal
11, 11' heat distribution, vertical
12 hinge
a edge spacing
b input width
z thickness

What is claimed is:

1. A method for connecting thermoplastic components, comprising:
 introducing energy to at least partially melt opposing surfaces of a first thermoplastic component having at least in part an extended-area coating and a second thermoplastic component, wherein the first thermoplastic component comprises an outer shell of a motor vehicle rear door, and the second thermoplastic component comprises an inner shell of the motor vehicle rear door,
 wherein connection points and/or connection surfaces of the first thermoplastic component lie at least partially behind a coated surface and do not appear through the coating after introducing energy.

2. The method of claim 1, wherein the first thermoplastic component and the second thermoplastic component are composed of polypropylene or a derivative thereof.

3. The method of claim 1, further comprising, before introducing energy:
 placing the first thermoplastic component in an upper tool part and the second thermoplastic component in a lower tool part;
 moving a heating device in a space between the upper tool part and the lower tool part; and then
 introducing energy in the form of heat from the heating device.

4. The method of claim 3, further comprising, after introducing energy:
 moving the heating device out of the space; and
 moving the upper tool part towards the lower tool part to thereby join together the first thermoplastic component and the second thermoplastic component.

5. The method of claim 3, further comprising, after placing the first thermoplastic component in an upper tool part and the second thermoplastic component in a lower tool part, but before moving the heating device in the space:
 calibrating the upper tool part and the lower tool part.

6. The method of claim 3, wherein the heating device has at least one frame-type heating zone.

7. The method of claim 3, wherein the heating device has heating zones on surfaces lying opposite to the first thermoplastic component and the second thermoplastic component.

8. The method of claim 7, wherein the heating zones which heats the first thermoplastic component produces an energy input that is reduced relative to an uncoated area.

9. The method of claim 7, wherein the heating zones are arranged in a closed frame structure.

10. The method of claim 7, wherein the heating zones are arranged spaced apart by an edge spacing from an edge of the first thermoplastic component and the second thermoplastic component.

11. The method of claim 3, wherein the heating device separately activates the heating zones.

12. The method of claim 3, wherein the heat input in the first thermoplastic component takes place over an input width.

13. The method of claim 3, wherein a penetration depth of the heat input for the first thermoplastic component is up to one-half of the thickness of the first thermoplastic component.

14. The method of claim 3, wherein a penetration depth of the heat input for the first thermoplastic component is up to two-thirds of the thickness of the first thermoplastic component.

15. A method for connecting components, comprising:
introducing indirect heat to melt opposing connecting points surfaces of a first thermoplastic component comprising an outer shell of a motor vehicle door and a second thermoplastic component comprising an inner shell of the motor vehicle door,
wherein the first thermoplastic component has, at least in part, an extended-area coating, and the connection points of the first thermoplastic component lie at least partially behind the extended-area coating and do not appear through the extended-area coating after the introduction of indirect heat.

* * * * *